(12) United States Patent
Moore

(10) Patent No.: US 7,438,469 B1
(45) Date of Patent: Oct. 21, 2008

(54) THERMOSTAT WITH OPTIONAL ADVERTISING DOOR

(75) Inventor: Glenn A. Moore, Montgomery, IL (US)

(73) Assignee: Braeburn Systems LLC, Montgomery, IL (US)

( * ) Notice: Subject to any disclaimer, the term of this patent is extended or adjusted under 35 U.S.C. 154(b) by 457 days.

(21) Appl. No.: 11/258,667

(22) Filed: Oct. 20, 2005

(51) Int. Cl.
 *G01K 1/08* (2006.01)
 *G01K 1/00* (2006.01)
 *G05D 23/00* (2006.01)
(52) U.S. Cl. .......................... 374/209; 374/208; 236/94
(58) Field of Classification Search .................. 374/158, 374/208, 209; 400/485; 62/158, 180; 236/94, 236/47, 51, 84, 49.3, 1 C
See application file for complete search history.

(56) References Cited

U.S. PATENT DOCUMENTS 5,491,615 A * 2/1996 Nichols ........................ 362/23

* cited by examiner

*Primary Examiner*—Chen-Wen Jiang
(74) *Attorney, Agent, or Firm*—Dillis V. Allen, Esq.

(57) ABSTRACT

A thermostat designed to accommodate service graphics after sale by the manufacturer directly or indirectly to the installer for installation at the ultimate consumer's location. The thermostat housing has a compartment door that is appropriately sized to receive the service graphics of the installer. The installer purchases the thermostat with no graphics and at his option orders replacement doors with his personalized graphics imprinted, from the manufacturer or its agent, and replaces the original doors with the replacements before selling the thermostat to the ultimate consumer.

The doors themselves are unique in that upon outward manual flexure of the door panel a pair of connectors tilt out of recesses in the housing permitting easy removal of the doors.

10 Claims, 8 Drawing Sheets

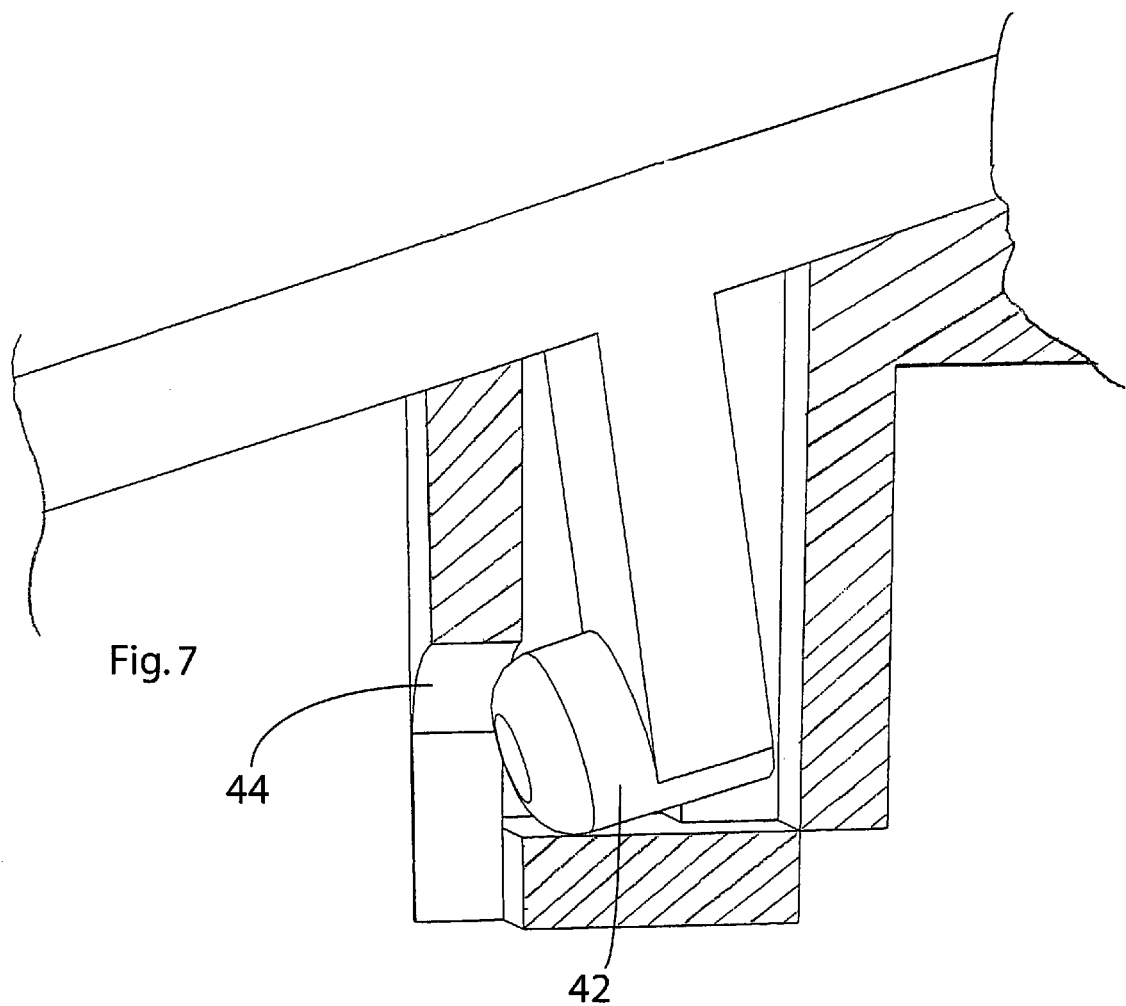

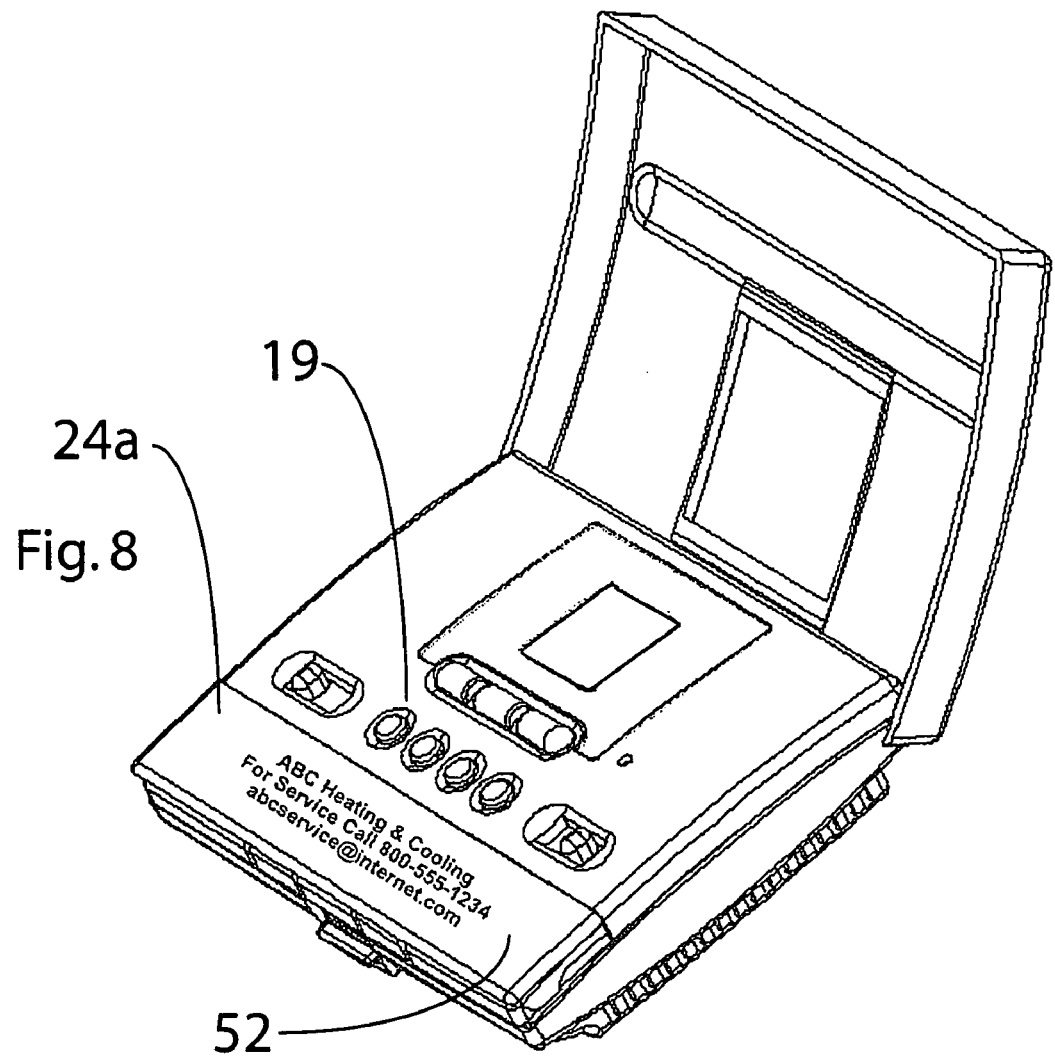

THERMOSTAT WITH OPTIONAL ADVERTISING DOOR

BACKGROUND OF THE INVENTION

Major appliance dealers and installers have for many years attached service stickers, including usually the name and phone number of the dealer-installer, directly on the appliance after installation at the consumer's location. These stickers, when attached to an appliance such as a water softener, hot water heater, or furnace usually located in a basement or crawl space, are not offensive or unwanted. However, some appliances are located in more visible areas of the residence or office and this type of advertising sticker by the dealer-installer may be offensive.

This problem is particularly acute in thermostats, where there is a limited area for placing such stickers, and even with larger thermostats, such stickers are offensive and usually unwanted because the thermostats are located in areas visible to guests and associates.

It is a primary object of the present invention to ameliorate the problems associated with dealer-installer service stickers noted above, particularly in the thermostat market.

SUMMARY OF THE PRESENT INVENTION

In accordance with the present invention, a thermostat is provided designed to accommodate improved dealer-installer graphics after sale of thermostats by the manufacturer. After purchase, the dealer-installer is prompted to purchase replaceable doors from the manufacturer imprinted with the dealer-installer customized graphics. The dealer-installer then removes the original graphics-less doors and replaces them with the custom graphics doors.

The thermostat housing has a compartment door that is conveniently sized to receive the service graphics of the installer. The installer purchases the thermostat with no graphics and at his option orders replacement doors with his personalized graphics imprinted from the manufacturer or its agent, and replaces the original doors with the replacements before selling the thermostat to the ultimate consumer.

The doors themselves are unique in that upon outward manual flexure of the door panel a pair of connectors tilt out of recesses in the housing permitting easy removal of the doors.

BRIEF DESCRIPTION OF THE DRAWINGS

FIG. 7 is a cross section through the left compartment door connector, enlarged, in an intermediate replacement-removal position, and;

FIG. 8 is a perspective view of the thermostat with the main cover open and the replacement door in a closed position.

DETAILED DESCRIPTION OF THE PREFERRED EMBODIMENTS

Figure 1:
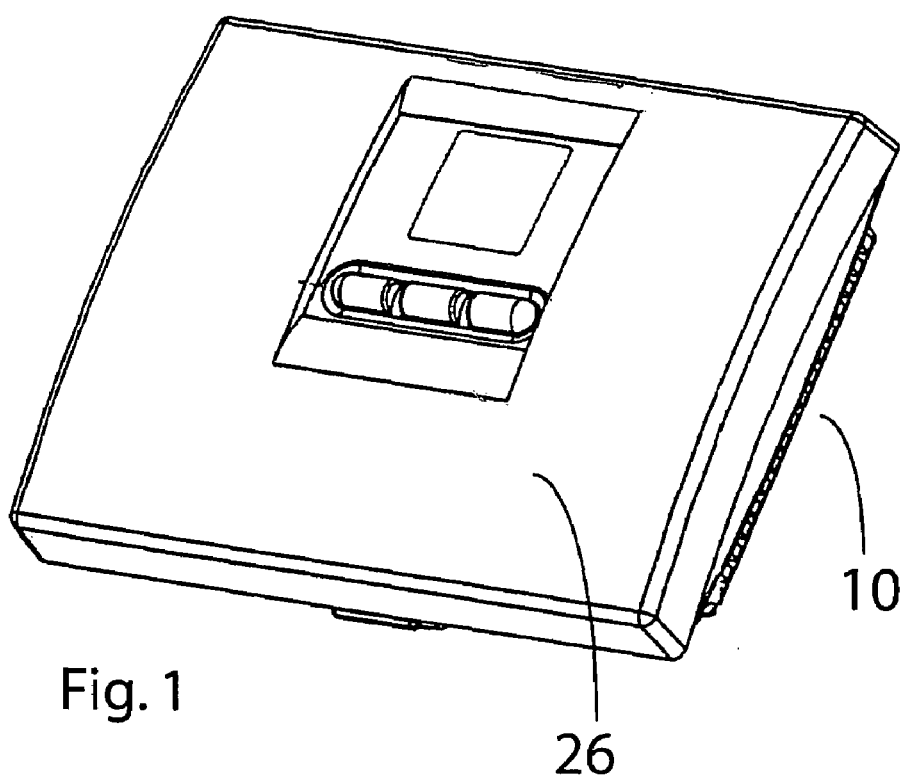
FIG. 1 is a perspective view of the present thermostat with the main cover closed.
Figure 2:
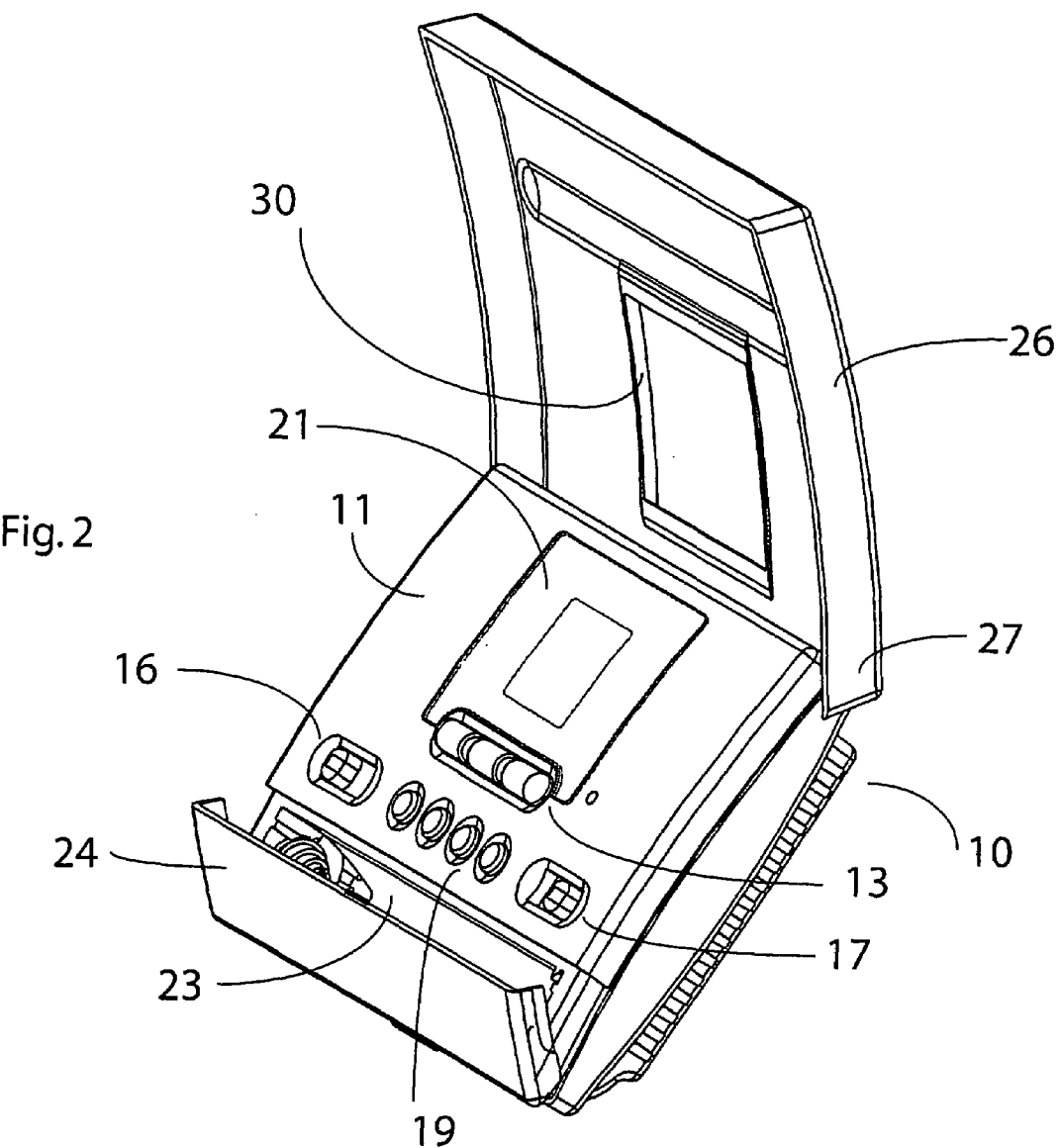
FIG. 2 is a perspective view of the present thermostat with the main cover opened and the battery compartment door partly opened.

Referring to the drawings and particularly FIGS. 1 and 2, the present thermostat 10 is illustrated in FIG. 1 with the main cover closed, and in FIG. 2 with the main cover open and the compartment door partly open. The thermostat 10 is seen to include a main housing 11 containing the appropriate circuit boards and power supply, not relevant to the present invention. Controls are illustrated on the front of the housing 11 including temperature control buttons 13, system cool-off-heat slide switch 16, fan auto-on slide switch 17, four programming control buttons 19, and an LCD visual display 21. A recessed battery compartment 23 is provided in the lower portion of the housing 11, concealed by a pivotal cover door 24. A main cover 26 is pivoted at 27 to close the forward face of the housing 11 in the position illustrated in FIG. 1 covering door 24, programming buttons 19, switches 16 and 17, but remaining exposed, the display 21 and the temperature control buttons 13 through a window 30.

Figure 3:
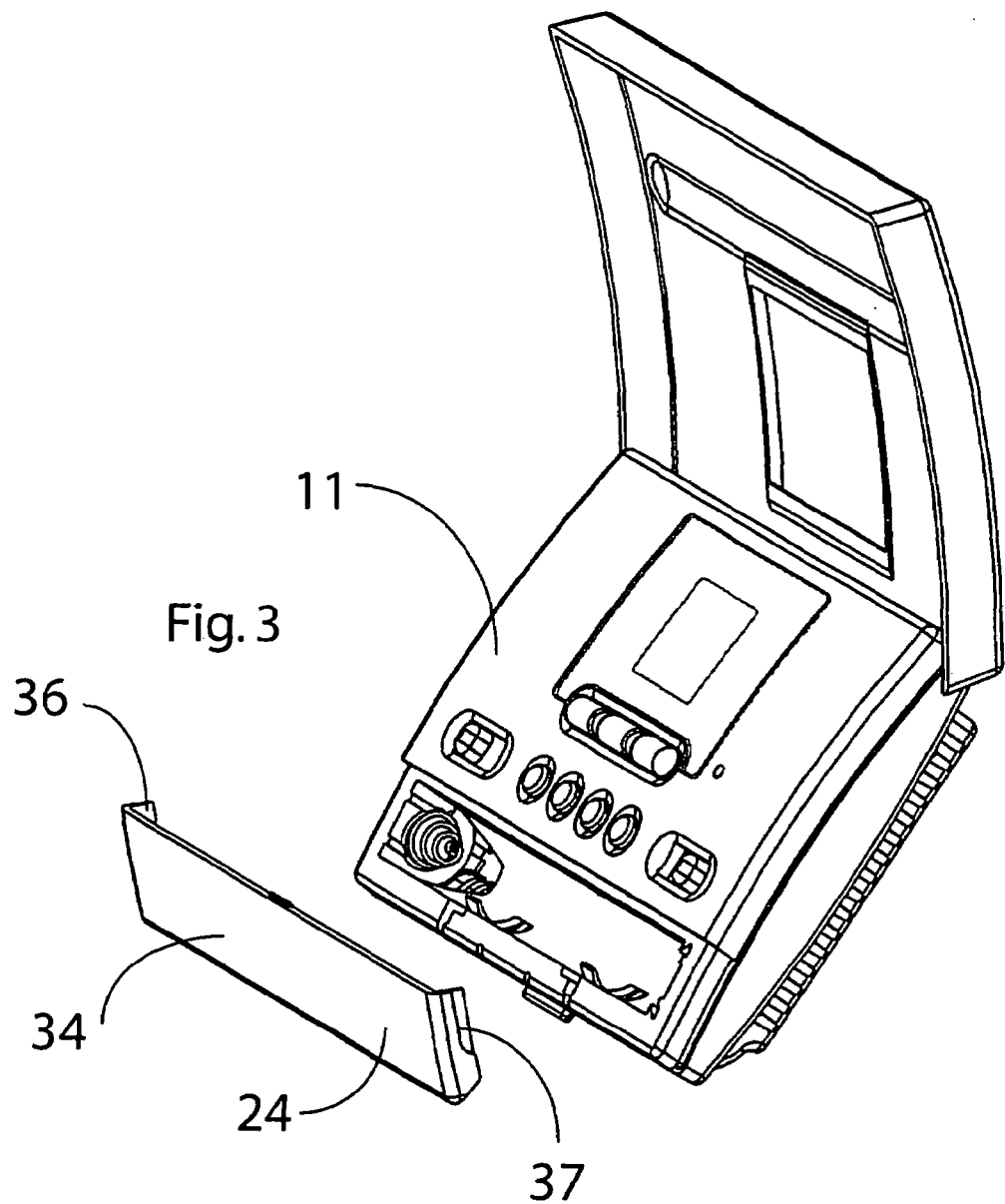
FIG. 3 is a perspective view similar to FIG. 2 with the battery compartment door removed.
Figure 4:
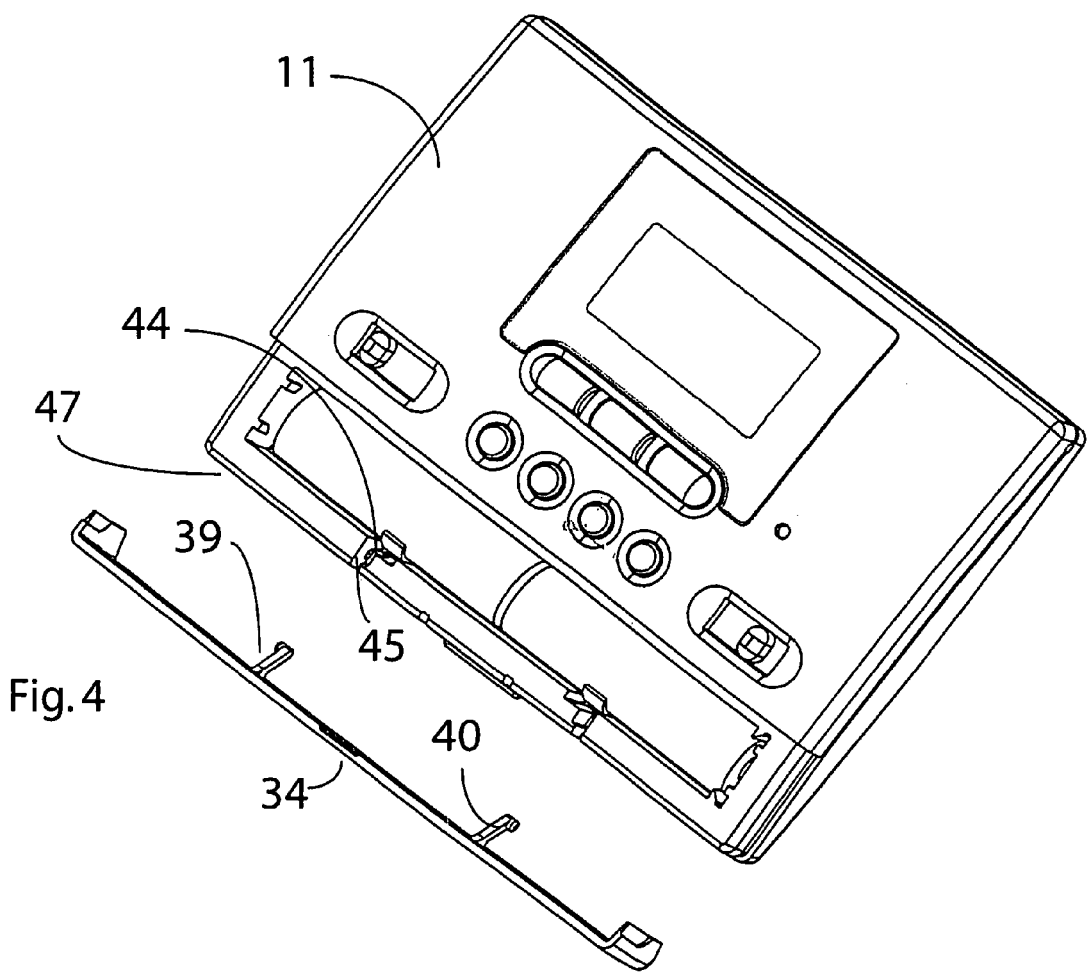
FIG. 4 is an enlarged perspective view similar to FIG. 3 with the main cover removed and the compartment door cover exploded.

As seen in FIGS. 3 and 4, the door 24 has a generally flat planar surface 34 with side flanges 36 and 37 that wrap around the main housing 11, as seen in FIG. 2, for example. Releasable connectors 39 and 40 project inwardly from the planar surface 34, and each include a shank portion 41 and a transverse cylindrical boss portion 42 with a semi-spheroidal surface 43 integral therewith that facilitates entry and exit of the boss 42 from transverse aperture 44 in a recess 45 formed in the forward edge 47 of the housing 11 as seen in FIG. 4.

Figure 6:
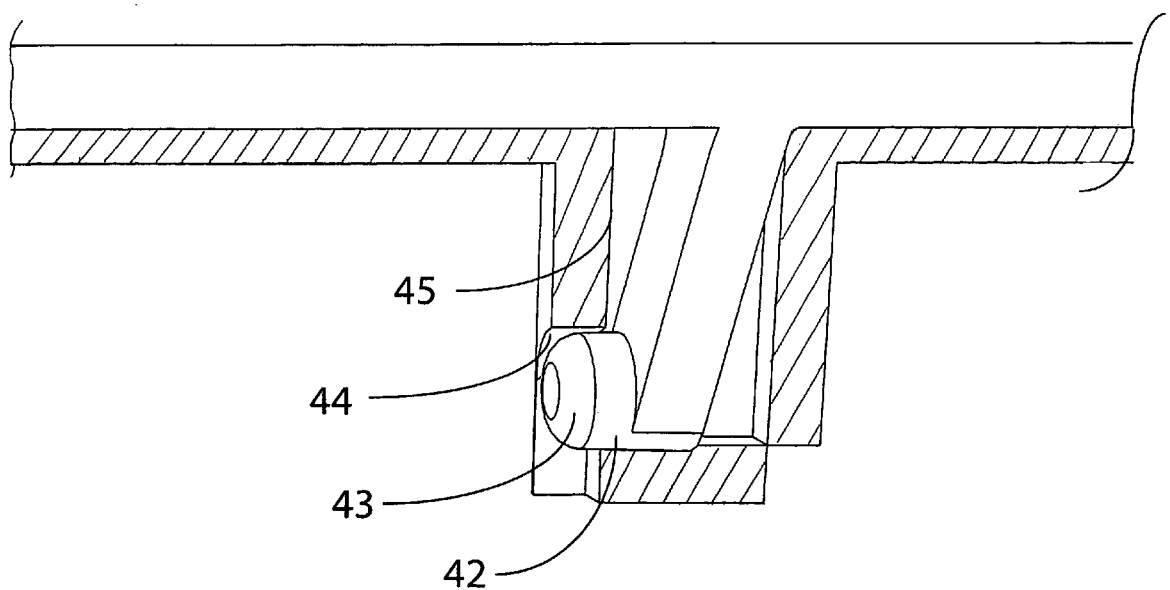
FIG. 6 is a cross section through one of the compartment door connectors illustrated in its locked position.

The boss 42 is shown in its locked position in FIG. 6, and in a partially removed-replaced position in FIG. 7, as it exits or enters the recess 44.

Figure 5:
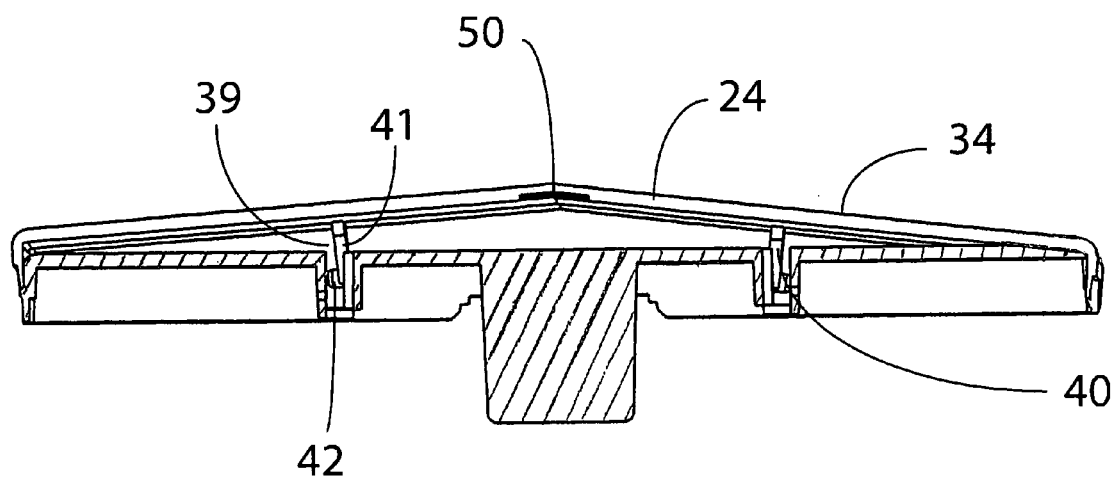
FIG. 5 is a cross section through the battery compartment showing the compartment door in an intermediate removal-replacement position.

As seen in FIG. 5, the panel 34 of door 24 is flexible so that when grasped manually near its center at 50 and pulled outwardly, the connectors 39 and 40 tilt inwardly toward the center of the door releasing the bosses 42 from the recesses 44 as seen in FIG. 7, permitting the door 24 to be easily removed from the housing 11.

The door is replaced in the opposite manner simply by bending the panel 34 at its center and re-inserting the connectors 39 and 40 into the recesses 45 and releasing the panel to automatically snap the bosses into the recesses 44.

In practice, the purchaser of the thermostat 10, typically a dealer-installer, will purchase a plurality of the thermostats and be prompted in the sales material to select graphics for a replacement cover 24a illustrated in FIG. 8, and this would be addressed to the attention of the manufacturer or its agent who would apply the service graphics shown in exemplary fashion at 52 in FIG. 8 to a plurality of replacement doors, which would be shipped upon additional payment to the dealer-installer who would remove the doors 24 from his inventory of thermostats and replace them with the doors 24a illustrated in FIG. 8.

One of the advantages of the present invention is that the cover 26 shown in its closed position in FIG. 1, covers not only the programming controls 19 but also the door 24a and the graphics 52, which are sometimes objectionable if left constantly exposed in a residential living area or a high traffic office area.

The invention claimed is:

1. A thermostat with a replaceable compartment door, comprising: a thermostat having a generally rectangular housing, a recessed compartment in the housing having an original removable door or cover, releasable connectors on the cover for holding the removable cover in place in the housing, and a replacement cover substantially the same as the original cover housing with service graphics thereon for replacing the original cover after the thermostat is sold by the manufacturer.

2. A thermostat with a replaceable compartment door as defined in claim 1, wherein the housing has a plurality of controls spaced from the recess and a visual display, a main cover on the housing for selectively covering the controls and compartment door or cover so the service graphics will not be visible when the main cover is in the closed position.

3. A thermostat with a replaceable compartment door as defined in claim 1, wherein the original compartment cover is pivotally mounted on the thermostat housing, said replacement cover having the same releasable connectors as the original cover.

4. A thermostat with a replaceable compartment door, comprising: a thermostat having a generally rectangular housing, a recessed compartment in the housing having an original removable door or cover, releasable connectors on the cover for holding the removable cover in place in the housing, a replacement cover substantially the same as the original cover housing with service graphics thereon for replacing the original cover after the thermostat is sold by the manufacturer, said housing having a plurality of controls spaced from the recess and a visual display, a main cover on the housing for selectively covering the controls and compartment cover so the service graphics will not be visible when the main cover is in the closed position, and the original compartment cover is pivotal mounted on the thermostat housing, said replacement cover having the same releasable connectors as the original cover.

5. A thermostat kit for providing service advertising on a thermostat, comprising: a plurality of similar thermostats each having housings with a compartment recess therein and a removable original cover or door for the recess that is removable after sale by the manufacturer, and a plurality of replacement cover doors having purchaser identifying service graphics thereon supplied by the manufacturer or its agent, said replacement cover or doors being substantially identical to the original cover doors so the purchaser can remove the original doors and replace them with the replacement doors.

6. A thermostat kit for providing service advertising on a thermostat as defined in claim 5, including a plurality of controls on the housing spaced from the compartment recesses and a visual display, a main cover on the housing movable from a first open position to a second closed position covering the controls and the cover door and service graphics.

7. A thermostat kit for providing service advertising on a thermostat as defined in claim 6, wherein the original cover doors are identical except for the service graphics and all are pivotal mounted on the thermostat housing.

8. A thermostat kit for providing service advertising on a thermostat as defined in claim 5, wherein the cover doors are pivotally mounted in the housing and have a pair of connectors extending into spaced recesses in the housing, said doors being bendable to tilt the connectors and permit removal of the doors from the housing.

9. A thermostat with a removable compartment door, comprising: a thermostat housing having a recessed compartment therein, a compartment door pivotally mounted on the housing having a pair of connectors extending into spaced recesses in the housing, said door being bendable to tilt the connectors and permit removal of the door from the housing.

10. A thermostat with a removable compartment door as defined in claim 9, wherein the spaced recesses have apertures therein for receiving a transverse boss on each of the connectors.

* * * * *